United States Patent [19]

Walling et al.

[11] Patent Number: 4,490,822
[45] Date of Patent: Dec. 25, 1984

[54] CR-DOPED YTTRIUM GALLIUM GARNET LASER

[75] Inventors: John C. Walling, White House Station; Michael L. Shand, Morristown, both of N.J.

[73] Assignee: Allied Corporation, Morris Township, Morris County, N.J.

[21] Appl. No.: 389,316

[22] Filed: Jun. 17, 1982

[51] Int. Cl.³ .............................................. H01S 3/16
[52] U.S. Cl. .................................................. 372/41
[58] Field of Search .......................... 372/41, 66, 39; 332/7.51

[56] References Cited

U.S. PATENT DOCUMENTS 3,997,853 12/1976 Morris et al. ................... 372/41
4,272,733 6/1981 Walling et al. .................. 372/41

OTHER PUBLICATIONS

Solid–State Laser Engineering, W. Koechner, Springer–Verlag, New York, (1976), pp. 32–39.
Laser Crystals, A. A. Kaminskii, Springer–Verlag, New York, (1981), p. 404.

Primary Examiner—James W. Davie
Attorney, Agent, or Firm—James Riesenfeld; Gerhard H. Fuchs

[57] ABSTRACT

A broadly wavelength-tunable laser is provided which comprises as the laser medium a single crystal of YGG:$Cr^{3+}$. The laser may be operated over a broad temperature range from cryogenic temperatures to elevated temperatures. Emission is in a spectral range from red to infrared, and the laser is useful in the fields of defense, communications, isotope separation, photochemistry, etc.

11 Claims, 2 Drawing Figures

U.S. Patent   Dec. 25, 1984   4,490,822
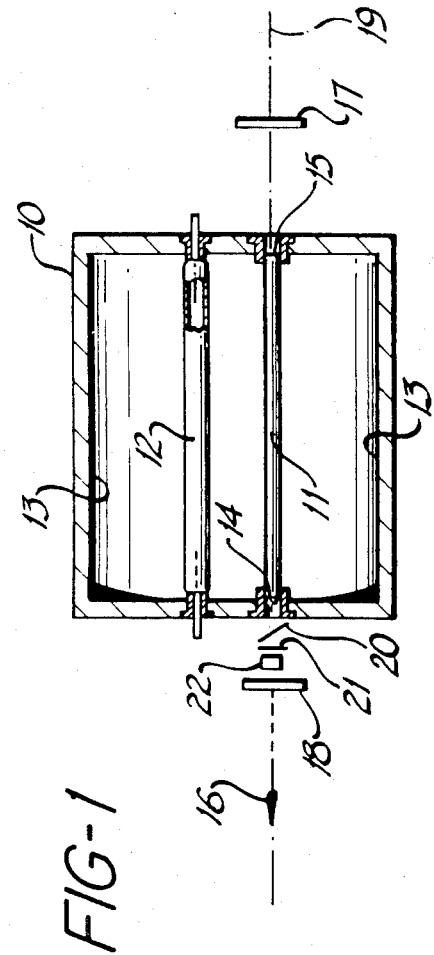
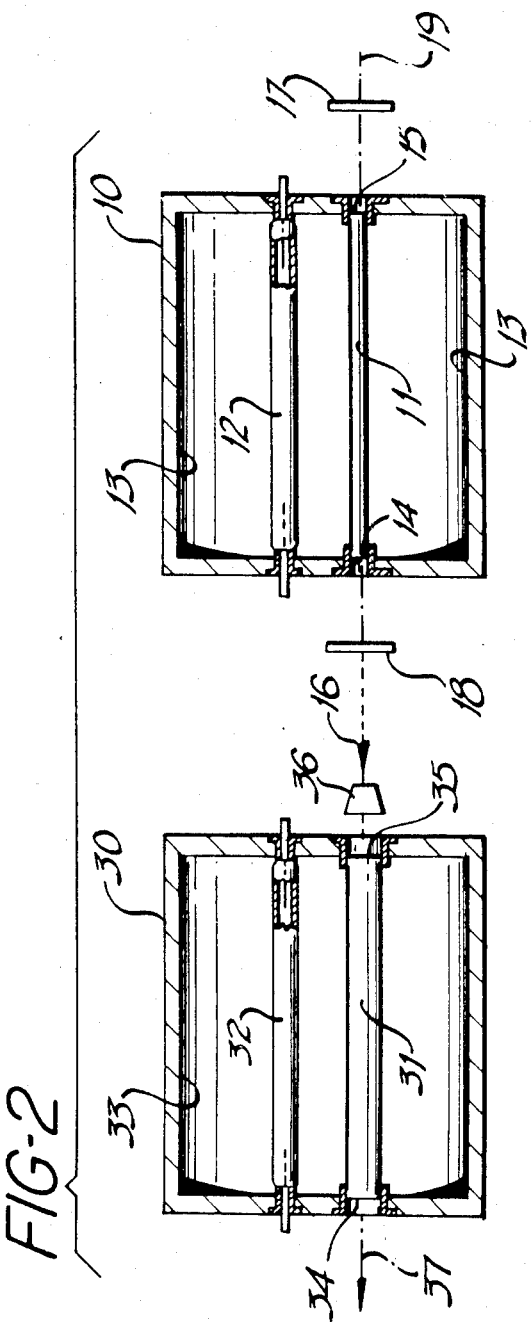

CR-DOPED YTTRIUM GALLIUM GARNET LASER

DESCRIPTION

BACKGROUND OF THE INVENTION

1. Field of the Invention

This invention relates to lasers and, more particularly, to a solid-state laser whose laser medium is a single crystal of YGG:$Cr^{3+}$ ($Y_3Ga_5O_{12}$:$Cr^{3+}$)

2. Description of the Prior Art

A number of solids, both crystals and glasses, have been found to be suitable for laser action since the first (solid-state) laser was demonstrated by Maiman in 1960. Generally, the laser-active materials involve a rare earth, actinide, or transition metal dopant in a crystalline or glass host. An extensive treatment of then-known solid-state lasers was published in 1976— *Solid-State Laser Engineering*, W. Koechner, Springer-Verlag, New York. More recently, a compilation of laser crystals was presented in *Laser Crystals*, A. A. Kaminskii, Springer-Verlag, New York (1981). YGG is among the garnet-structure crystalline laser materials tabulated by Kaminskii (p. 404). The activator ions disclosed are all rare earths—$Nd^{3+}$, $Ho^{3+}$, and $Yb^{3+}$(p. 451).

Laser action has also been demonstrated in GdScGa:$Cr^{3+}$ garnet (A. Beimowski et al., XIIth Int'l. Quantum Electronics Conference, Munich, June, 1982) and alexandrite (BeAl$_2$O$_4$:$Cr^{3+}$), a naturally occurring mineral having the chrysoberyl structure (U.S. Pat. No. 3,997,853). Among the distinctive features of the alexandrite laser is its tunability (U.S. Pat. No. 4,272,733).

SUMMARY OF THE INVENTION

In accordance with the present invention, a laser is provided that comprises a laser medium comprising a single crystal of YGG:$Cr^{3+}$ ($Y_3Ga_5O_{12}$:$Cr^{3+}$), pump means for exciting the laser medium to emit coherent radiation, and an optical resonant cavity for supporting coherent radiation emitted by the laser medium. Generally, the laser includes mirrors forming an optical resonator adapted for maintaining laser oscillations between the mirrors. The output of the laser is broadly tunable; thus, if the laser includes tuning means the output can be selected at any wavelength in the deep red to near infrared range of the electromagnetic spectrum.

Besides tunability, another advantage provided by the YGG:$Cr^{3+}$ laser medium is 4-level operation. A 4-level laser is a class of lasers characterized by the fact that the terminal level for the laser transition is not the ground state of the ion. In these lasers there can be little if any reabsorption of laser emission by the unexcited ground state ions within the laser host. This permits low threshold, high efficiency operation of the laser. In YGG:$Cr^{3+}$, as in other phenon-terminated lasers, the laser transition involves the simultaneous emission of a photon and a phonon, so any reabsorption of this emission requires the simultaneous absorption of both quanta. The probability of this reabsorption is understandably low, so the threshold for YGG:$Cr^{3+}$ 4-level laser action is low.

The tunable laser of the present invention avoids the disadvantages of both tunable dye lasers and previously known vibronic lasers other than alexandrite. High power operation can be achieved without need for auxiliary equipment; Q-switched operation is possible; and the laser medium is stable and neither toxic nor corrosive. Emission is partly in the visible portion of the spectrum. As in the case of alexandrite, laser gain increases with increasing temperature.

BRIEF DESCRIPTION OF THE DRAWINGS

FIG. 1 is a diagramatic illustration in partial cross-section of a typical laser apparatus using a laser rod together with optional tuning means.

FIG. 2 is a schematic illustration of an oscillator-amplifier laser system.

DETAILED DESCRIPTION OF THE INVENTION

The laser medium employed in this invention comprises a single crystal of yttrium gallium garnet doped with $Cr^{3+}$ ($Y_3Ga_5O_{12}$:$Cr^{3+}$). The YGG:$Cr^{3+}$ is excited by a pump source of incoherent or coherent radiation and emits coherent radiation at a wavelength in the deep red to near infrared range of the electromagnetic spectrum. A tuning means may be incorporated in the laser to permit the output wavelength to be selected.

Chromium-doped yttrium gallium garnet is a cubic crystal that can be prepared synthetically by Czochralski growth. For use as a laser medium, a YGG:$Cr^{3+}$ crystal is preferably either rod-shaped or slab-shaped. A slab preferably has a substantially rectangular cross-section in a plane normal to its long dimension, with the width/thickness ratio of the rectangle equal to or greater than 2.

The YGG:$Cr^{3+}$ laser medium is optically pumped. In general, it is desirable to have pump radiation absorbed uniformly throughout the laser medium. Since absorption depends on chromium concentration, there is an inverse relationship between rod diameter or slab thickness and optimum dopant concentration. For typical diameters and thicknesses, the chromium dopant concentration is preferably in the range from about 0.005 to about 20 atom percent with respect to gallium sites, more preferably from about 0.02 to about 5 atoms percent.

Suitable pump lamps are those that emit strongly in the wavelength region in which YGG:$Cr^{3+}$ absorbs. For example, either pulsed or continuous lamps that emit intense incoherent light at wavelengths shorter than about 700 nm are suitable. Such lamps, well known in the art, include gaseous discharge lamps, filled with xenon and/or krypton and designed to operate either continuous wave (cw) or pulsed, and metallic vapor sources such as mercury, sodium, cesium, rubidium, and/or potassium. A cw mercury arc lamp has been found particularly suitable as a pumping source for cw laser operation, and a pulsed xenon arc lamp particularly suitable as a pumping source for pulsed laser operation.

Alternatively, the YGG:$Cr^{3+}$ laser medium may be pumped with a coherent light source, either pulsed or cw, that emits in the wavelength region in which emerald absorbs. For cw excitation the krypton ion and argon ion lasers are representative. For pulsed laser excitation, almost any coherent source having adequate power and an emission wavelength below 695 nm would be an effective pump for the present laser. Examples of suitable sources are doubled Nd:YAG, excimer lasers, and nitrogen lasers.

In addition to the basic elements of the laser, i.e., the laser medium and optical pump, the laser of the present invention may optionally include means for Q-switching. The Q-switch "spoils" the quality factor, Q, of the cavity for an interval of time during which energy is stored. At the appropriate moment, the Q-switch is turned to the high gain condition, and the stored energy in the medium is suddenly released in a "giant pulse" of very short duration. Q-switch means may comprise a saturable dye absorber, an acousto-optic Q-switch, or a polarizer and Pockels cell placed in the beam path. The polarizer may be omitted, particularly at low excitation power. The laser may also be mode-locked to produce pulse widths inversely related to the bandwidth.

To accomplish tuning, any conventional tuning means may be used. Examples of suitable tuning means include a prism, optical grating, birefringent filter, multilayer dielectric coated filter, or lens having longitudinal chromatic aberration. Particularly suitable is a birefringent filter of the general type described by G. Holtom and O. Teschke, "Design of a Birefringent Filter for High-Power Dye Lasers," IEEE J. Quantum Electron. QE-10, 577 (1974). This type of filter is sometimes referred to as a "Lyot filter." (B. Lyot, Compt. Rend. 197, 1593 (1933)).

A high power YGG:$Cr^{3+}$ laser may comprise the basic laser, as described above, as the "oscillator stage" of a laser amplifier. The amplifier uses such an oscillator stage to provide input radiation for one or more "amplifier stages," which typically include a YGG:$Cr^{3+}$ crystal and flashlamp, or other pump source, mounted inside an optical cavity.

An advantage of YGG:$Cr^{3+}$ as compared with some other tunable solid-state laser materials is that it can operate at room temperature and above, in addition to lower temperatures. Depending on the power level, it may be desirable to include means for controlling the laser rod temperature. Temperature control means may be any of those well known in the art; for example, a circulating fluid adapted for absorbing heat from, or transmitting heat to, the laser medium. The circulating fluid may be air, water, a cryogenic liquid, etc. A heater is used to control the fluid temperature when necessary.

As the temperature is increased, a limitation on laser operation is set by a corresponding reduction of the lifetime of the excited state of chromium ions. Excitation is best accomplished during a time interval that is of the order of the lifetime, or shorter. If the lifetime is reduced below about 60 $\mu s$, flashlamps having a useful operating life are not readily available to provide sufficient excitation in the required short time interval.

FIG. 1 illustrates a laser apparatus of this invention. The laser medium 11, comprising a YGG:$Cr^{3+}$ crystal, and pumping source 12 are housed in container 10, which has a highly reflective inner surface 13 which defines an elliptical cavity. Reflection at surface 13 may be diffuse or specular. The axes of the laser medium 11 and the pumping source 12 are each located along a focal line of the ellipse formed by container 10. Laser medium 11 is normally provided with coated ends 14 and 15 having a conventional dielectric anti-reflection coating. Completely reflecting mirror 17, optional tuning element 20, and partially reflecting mirror 18 are positioned external to container 10 along cylindrical axis 19 of laser medium 11. Lasing action is evidenced by emission of highly collimated coherent radiation whose wavelength is determined by the orientation of the tuning element 20. The radiation, shown as arrow 16, emanates from partially reflecting mirror 18. Mirrors 17 and 18 may both be partially reflecting. If necessary to maintain the desired operating temperature, laser medium 11 and pumping source 12 are cooled by a fluid circulated through container 10. An optional Q-switch is shown as comprising polarizer 21 and Pockels cell 22.

As shown in FIG. 2, an amplifier stage may be used with the apparatus of FIG. 1 in a high power laser system of this invention. The apparatus of FIG. 1 is then considered the "oscillator stage" of the amplifier. The amplifier stage is located in the output beam of the oscillator stage. It consists essentially of a container 30 which has a highly reflective inner surface 33 which defines an elliptical cavity. An amplifier rod 31, excited by flash lamp 32, is normally provided with coated ends 34 and 35 having a conventional dielectric anti-reflection coating. The amplifier rod may be of a larger diameter than the oscillator rod 11, in which case a beam expanding telescope 36 is located between the stages in order to match the beam size to the rod size. Unlike the oscillator stage, the amplifier stage normally does not have mirrors at its ends to form a cavity, and the amplification of the oscillator output occurs during only one pass of the laser beam through the amplifier rod. However, for some applications, the amplifier may be fitted with partially reflecting mirrors to feed back part of the amplifier output into the amplifying medium. The spectral and temporal characteristics of the output of this regenerative oscillator can then be determined by injecting a suitably tailored signal from the primary oscillator in a manner similar to that employed with the single pass amplifier. More than one amplifier stage may be used. The amplified output shown as arrow 37 emanates from amplifier rod 31.

We claim:
1. A laser comprising:
   a laser medium comprising a single crystal of $Y_3Ga_5O_{12}:Cr^{3+}$, in which the $Cr^{3+}$ concentration is in the range between about 0.005 and about 20 atom percent with respect to gallium sites,
   pump means for exciting the laser medium to emit coherent radiation, and
   an optical resonant cavity for supporting coherent radiation emitted by the laser medium.
2. The laser of claim 1 in which the laser medium is substantially in the shape of a cylindrical rod whose long dimension is along the cylinder axis.
3. The laser of claim 1 in which the laser medium is substantially in the shape of a slab having a substantially rectangular cross-section in a plane normal to its long dimension.
4. The laser of claim 1 in which the pump means comprises a pulsed incoherent light source emitting at wavelengths shorter than about 700 nm.
5. The laser of claim 1 in which the pump means comprises a continuous incoherent light source emitting at wavelengths shorter than about 700 nm.
6. The laser of claim 1 in which the pump means comprises a pulsed coherent light source emitting at wavelengths shorter than about 700 nm.
7. The laser of claim 1 in which the pump source comprises a continuous coherent light source emitting at wavelengths shorter than about 700 nm.
8. The laser of claim 1 further comprising means for Q-switching the laser.
9. The laser of claim 1 further comprising means for controlling the temperature of the laser medium.
10. The laser of claim 1 further comprising means for tuning the coherent radiation in a spectral range from red to infrared.
11. The laser of claim 1 further comprising:
   a second laser medium comprising a single crystal of $Y_3Ga_5O_{12}:Cr^{3+}$, said second laser medium positioned in the beam of coherent radiation; and
   pump means for exciting the second laser medium to emit an amplified beam of coherent radiation.

* * * * *